United States Patent
Ao et al.

(10) Patent No.: US 8,418,142 B2
(45) Date of Patent: Apr. 9, 2013

(54) ARCHITECTURE FOR DATA VALIDATION

(75) Inventors: Keng Lap Ben Ao, San Mateo, CA (US); Steve Bull, Redondo Beach, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1078 days.

(21) Appl. No.: 12/017,821

(22) Filed: Jan. 22, 2008

(65) Prior Publication Data

US 2009/0187879 A1    Jul. 23, 2009

(51) Int. Cl.
*G06F 9/44*    (2006.01)
(52) U.S. Cl. ............... 717/124; 717/126; 717/120
(58) Field of Classification Search ............ 717/120, 717/124, 126
See application file for complete search history.

(56) References Cited

U.S. PATENT DOCUMENTS

| | | | |
|---|---|---|---|
| 7,353,248 B1 * | 4/2008 | Kirkpatrick et al. | 709/203 |
| 2005/0066263 A1 * | 3/2005 | Baugher | 715/500 |

OTHER PUBLICATIONS

Nick Ferrier, Stored Procedures for Java Programmers, Aug. 13, 2003, O'Reilly, http://onjava.com/pub/a/onjava/2003/08/13/stored_procedures.html.*
Winterfeldt, "Struts in action", Chapter 12, "Validating user input", Nov. 2002, Manning Publications, ISBN 1930110502, p. 365-408.*

* cited by examiner

*Primary Examiner* — Li B Zhen
*Assistant Examiner* — Duy Khuong Nguyen
(74) *Attorney, Agent, or Firm* — Kilpatrick Townsend & Stockton LLP

(57) ABSTRACT

A data validation architecture is provided that minimizes duplicate code and enables easy creation of new validations using a high-performance and scalable design. Such an architecture provides sufficient flexibility to disable certain validations when they are not applicable to the flow, interpret validation failures differently according to requirements of the calling application, and specify the type of document for which a particular validation is applicable. The architecture provides a standardized flow for performing data validation, specifying a set of required parameters for validation subroutines, as well as where validation results are to be stored for access by a calling program. Such an architecture also provides a framework for performing common processing required for most validation flows without restricting the flexibility of the validation subroutines.

25 Claims, 4 Drawing Sheets

ARCHITECTURE FOR DATA VALIDATION

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to data validation, and in particular to providing a scalable architecture for validating data that reduces duplication of code and enables easy creation of new validations.

In many computer-and network-based systems, information often needs to be validated to ensure, for example, that the information is complete, correct, in the proper format, of a maximum length, or any of a number of other such aspects. When validating data to be stored into a database system, for example, there can be a number of such validations that can be done, with strict rules as to the form and content of the data. Because many systems today are distributed and further involve both client-side and server-side aspects, this can allow validation to be done at a number of different points across a system or network. Because these different points can be different types of devices, can be running different software, and/or can utilize different technology, different versions of the code needed for data validation typically needs to be generated and maintained, which results in an undesirable duplication of code. The need for such duplication further results in increased cost and time in developing, maintaining, and deploying the code, as well as increased complexity in calling validations depending upon where the validation will be done.

In an example of an e-business application, for example, applications can be developed on two main technology stacks, such as Java and PL/SQL. FIG. 1 illustrates an exemplary environment 100 for implementing such an application, wherein a client device 102 communicates with an application server 108 across a network 104. In this example the network is the Internet, and the environment accordingly utilizes a Web server 106 to receive requests and serve content, but it should be understood that any of a number of other appropriate networks such as intranets or local area networks (LANs) can be used as discussed elsewhere herein. In such an environment, a validation can be done on the client device 102, such as before the data is submitted across the network, and another validation can be done at the application server 108 (or another appropriate back-end device) before the data is entered into the appropriate data storage device 110. In one example, and entity level validation can be done on the client device, such as for validating that the quantity for an item being ordered on a purchase order is greater than 0, using a Business Components for Java (BC4J) architecture for a browser application where the validation code is generally contained within the entity object (EO) itself. A validation also can be done on the back-end, or the client side, for an import program using PL/SQL or another appropriate language, which allows the data to be imported without a user having to enter the data through the browser application. Both the validation module for the browser application and the validation module for the import application need to execute the same (or similar) validations, such as where each supports purchase order creation. Currently, this requires repeating the validations in both technology stacks, utilizing different code algorithms.

Further, there may be a number of fields of data that need to be validated. Currently, there is no easy way to control the order and timing of the validations for the various fields. When passing between pages such as a summary page and a detail page, it would be desirable to be able to control the order and timing, along with other such aspects.

BRIEF SUMMARY OF THE INVENTION

Systems and methods in accordance with various embodiments provide an architecture for data validation that minimizes duplicate code, and enables easy creation of new validations, using a high-performance and scalable design. Such an architecture also provides sufficient flexibility to disable certain validations when they are not applicable to the flow, interpret validation failures differently according to requirements of the calling application, and specify the type of document for which a particular validation is applicable. A validation architecture can provide a standardized flow for performing data validation, the standard specifying a set of required parameters for validation subroutines, as well as where validation results are to be stored for access by the calling program. Such an architecture also can provide a framework for performing common processing that is required for most validation flows, without restricting the flexibility of the validation subroutines. While the architecture provides great flexibility, validation processing can be standardized, such as by specifying the source for most validation data.

In one embodiment, data is validated by first providing a validation architecture including code for validating data, where the code is written in a first language. The validation architecture includes or provides an interface operable to receive validation calls from applications written in the first language and at least one other language. When a validation call is received that includes a validation set, a validation is performed for each instance of information in the validation set. In this embodiment, the validation set includes information for at least one validation to be executed using the validation architecture. Any errors or warnings are determined for each validation, and the results of each validation along with any errors or warnings are returned in response to the validation call.

The validation call in this embodiment can be received from a remote application, a local application, a front-end application, a back-end application, a front-end layer, a back-end layer, or a middle layer. The call in one embodiment is a bulk call including a plurality of instances of information to be validated. The first language can be a language such as PL/SQL, where the interface is a PL/SQL API operable to function as a starting point for entity-level validations. The method also can include steps such as defining standardized methods for passing entity attributes to be validated in the validation calls, as well as storing all validation logic relating to the validation architecture in a central location. Steps also can include receiving a subroutine to enable an additional validation procedure to be executed via the validation framework, and registering the subroutine with the validation framework.

In addition to other methods that can be used in accordance with these and other embodiments, there also are a number of systems, computer products, and other such aspects for implementing, practicing, performing, or otherwise utilizing aspects of the various embodiments.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Figure 1:
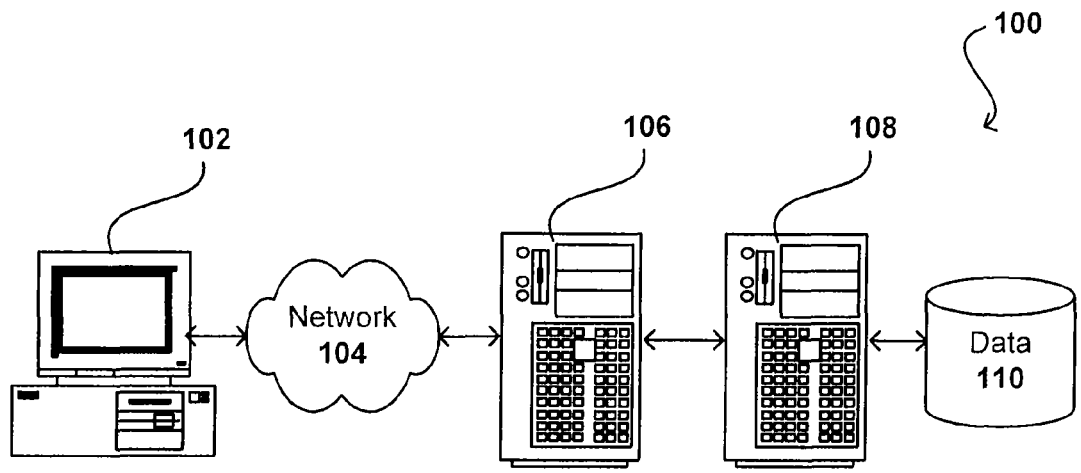
FIG. 1 illustrates an environment that can be used for data validation.

Systems and methods in accordance with various embodiments overcome the aforementioned and other deficiencies in existing validation approaches by providing an architecture useful in standardizing a portion of the validation process. An interface, such as a PL/SQL API in one embodiment, can serve as a starting point for all entity-level validations. Underneath the interface is a validation architecture that provides the framework for developers or other users to define validations.

A validation architecture in accordance with one embodiment includes a single entry point for invoking the entity validation API, as well as a standard way to define methods for passing in the entity attributes to be validated, in ways that are efficient, easy to maintain, and take advantage of maximum code sharing ability. The architecture also can include a central location for storing all validation logic for the various entities, which makes it easy for developers to locate the appropriate code. An architecture can provide a standard way for calling programs to define the validations to be executed, as well as a standard way to record validation errors and report any errors back to the calling program. The architecture can reduce code duplication while allowing developers to easily add validations for any entity. While the architecture can be developed in a certain language, such as PL/SQL, validations can be shared by multiple modules regardless of whether they are called in languages such as Java or PL/SQL, for example. A calling program can allow for the validation of multiple records from the same entity in a single call, while validations can be done in bulk or batches for better performance, where appropriate. As discussed elsewhere herein, previous approaches would have performed validations record by record.

A user of a calling application or other such user likely would prefer to have at least some control over when validations occur. Further, it would be desirable for the validation to be able to be shared between the front end and the back end, such that the validation can be accomplished without duplication whether a user enters data into a front end application such as a Web page and/or dumps data into tables in an interface application that can be imported into the back-end applications. Currently, a validation for the front-end application needs to be in the front end layer, such as a Java layer, while the back-end process is done in PL/SQL in one example. In such an example, Java cannot be called from PL/SQL, but PL/SQL can be called from Java. In such a case, a validation architecture can be created in the PL/SQL layer, such that programs in both layers can call the PL/SQL-based validation, providing a single access point for validations.

Further, using such an architecture provides advantages over certain existing systems because it is not necessary to call each validation separately when there are a number of validations to be processed. In many existing systems, a user or application uses calls to validate a first field for a record then validate a second field for a record, and so on, such that the validations are done one call at a time. A user of a system in accordance with one embodiment is able to predefine a list of validations to be done within the architecture. A user then can have a list or validation set indicating the validations that will be done. A calling program then can simply use that validation set and pass the set to the validation architecture. Passing the set indicates the validations to be done, and the calling program does not indicate or care how the validations are done. The architecture will execute the validations in the set one by one, without separate calls or instructions, and will have a common way of returning any errors or warnings. Thus, the calling program does not have to worry about how certain things are implemented, and can be located at any appropriate layer in the system. The use of standardized calls and logic allows any appropriate application, module, or other such entity to simply pass in the validation set and the architecture takes over processing.

When new validations are required by a business flow in one embodiment, a developer can implement a minimal set of subroutines to enable the validations. First, the developer implements each subroutine to perform a specific validation. These subroutines may exist outside of the validation packages, but still obey the specifications of a validation subroutine. Once these subroutines are implemented, the developer makes the subroutines known to the validation architecture and registers the subroutines as part of an executable set of validations. Such functionality can be provided easily with just a small bit of coding in the validation package.

Once the validation subroutines are made known to the validation architecture, calling applications or other such "callers" can invoke a validation interface (e.g., an API) which will execute the appropriate validations. The validation architecture can call each validation subroutine, collect all of the output, and return any validation errors or warnings to the caller as, for example, a PL/SQL object.

Figure 2:
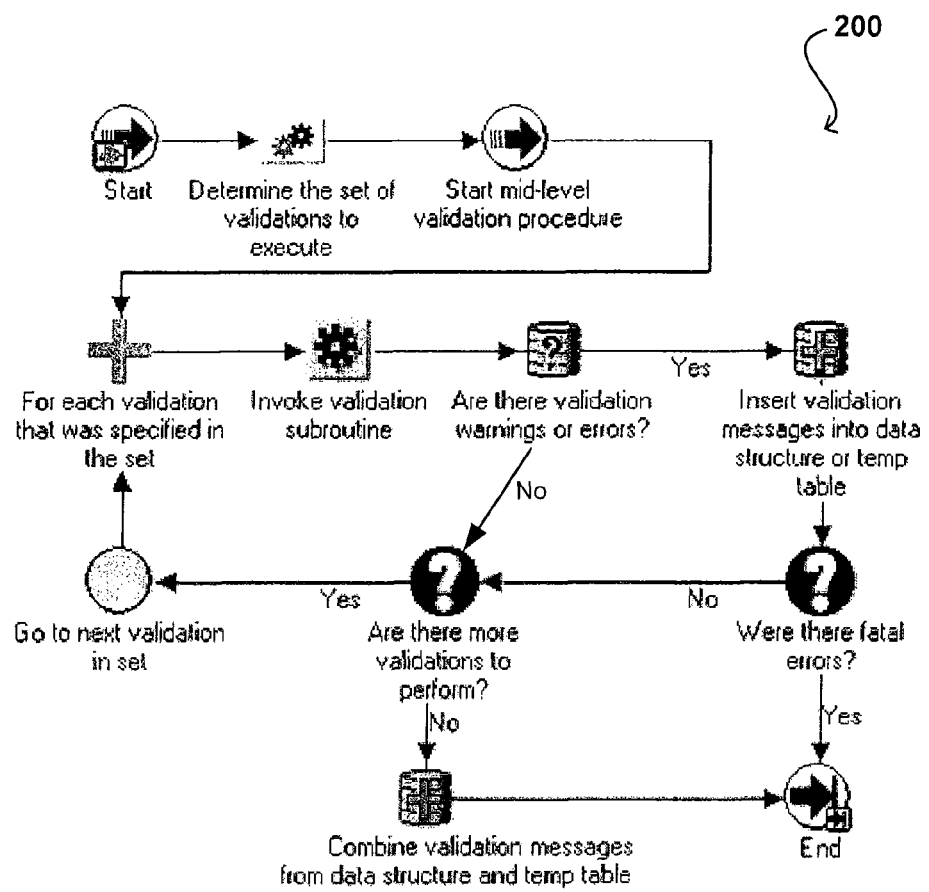
FIG. 2 illustrates an exemplary execution flow of a validation architecture in accordance with one embodiment of the present invention.

FIG. 2 illustrates an exemplary execution flow 200 of a validation architecture in accordance with one embodiment. Callers of a validation architecture can implement such a flow by constructing an object, such as a PL/SQL object where the architecture is developed in PL/SQL, containing all the values to be validated. The caller then can call an interface provided by the validation architecture, and provide an identifier to indicate which validation set to use. So, in the flow illustrated, a caller determines the set of validations to execute and starts a mid-level validation procedure by calling the appropriate interface of the architecture. For each validation that was specified in the set, a validation subroutine can be invoked. if there are no validation errors or warnings for that validation, and there are more validations to perform, the system can go to the next validation in the set and invoke the next subroutine. If there are validation errors or warnings, an invalidation message can be inserted into the data structure, a temporary table, or another appropriate location. If the error is fatal, the validation process can end without further processing. If any error or warning is detected that is not fatal, the process can continue if there are additional validations, otherwise the validation messages can be combined and the process ended. Once the results and any messages are determined, the results can be retrieved from a validation results or similar table, and the results and any messages can be displayed to the user, a report can be generated, the results can be transmitted or stored to an appropriate location, or any other appropriate final step for handling the results. Such flow can be standard to all validation flows, and thus is not dependent on the particular validation API that is called.

In one embodiment, APIs that will be exposed by the validation architecture have the following common parameters:

| Parameter | Type | DataType | Description |
| --- | --- | --- | --- |
| p_<ENTITY>_rec | IN | <ENTITY>_VAL_TYPE | This parameter is a PL/SQL object. Each entity that utilizes this architecture for validation will have a corresponding object in the database (e.g. PO_HEADERS_VAL_TYPE is the corresponding object for PO_HEADERS table). The caller populates this object with data that will be used inside the validation subroutines. |
| P_validation_set | IN | VARCHAR2(30) | Identifier to indicate the set of validations to be used. |
| P_parameter_name_tbl | IN | PO_TBL_VARCHAR2000 | If there are extra parameters to be passed to the validation routine, this stores the list of names for such parameters |
| P_parameter_value_tbl | IN | PO_TBL_VARCHAR2000 | The values for the corresponding entries in p_parameter_name_tbl |
| x_results | OUT | PO_VALIDATION_RESULTS_TYPE | Data structure to store the results produced by the validation subroutines. |
| x_result_type | OUT | VARCHAR2(30) | Indicates whether the validation subroutines were SUCCESSFUL, or produced WARNINGS/FAILURES/FATAL ERRORS. This is a rollup of the result type of each validation subroutine. |

Although these parameters are suggested for validation APIs in one embodiment, certain validation subroutines may require additional input parameters, which may be passed in through the exposed APIs.

A validation architecture can be used to validate an entity record, such as a header or line of a purchase order. Each entity that utilizes this validation architecture will have a corresponding <ENTITY>_VAL_TYPE object defined in the database. The object in this example is essentially a list of tables, with each table having one column corresponding to an attribute in the entity. An example of such an object, here PO_HEADERS_VAL_TYPE, takes the form of the following:

```
CREATE OR REPLACE TYPE po_tbl_varchar1 AS TABLE OF VARCHAR2(1);
CREATE OR REPLACE TYPE po_tbl_varchar30 AS TABLE OF VARCHAR2(30);
CREATE OR REPLACE TYPE po_tbl_varchar2000 IS TABLE OF
VARCHAR2(2000);
CREATE OR REPLACE TYPE PO_HEADERS_VAL_TYPE AS OBJECT
( EMAIL_ADDRESS                    PO_TBL_VARCHAR2000
, SUPPLIER_NOTIF_METHOD            PO_TBL_VARCHAR30
, FAX                              PO_TBL_VARCHAR30
, RETRO_PRICE_COMM_UPDATES_FLAG    PO_TBL_VARCHAR1
...
);
```

Here, it is the responsibility of the caller to create an instance of this object and populate the object with the records to be validated before invoking validation architecture. Due to the way validation type object is defined, the attributes in entity records to be validated can be transposed into tables of attributes. Such an approach in one implementation allows bulk processing to be performed (where available) on individual attributes inside validation subroutines.

In some instance validation requires parameters that are not in the entity. Such parameters are passed in as two lists in one embodiment, including a first list that stores the names of these parameters, and a second list that stores the corresponding values for these parameters (i.e., p_parameter_name_tbl and p_parameter_value_tbl). Each validation subroutine in one embodiment must take common parameters. Examples of such common parameters are as follows:

| Parameter | Type | DataType | Description |
| --- | --- | --- | --- |
| p_<attr>_tbl | IN | po_tbl_<type> | Attributes needed in order to perform the validation in the subroutine |
| x_result_set_id | OUT | NUMBER | Identifies the results produced by the validation subroutines that have been stored in the validation results table. The caller can use this id to retrieve the results of the validation, if necessary |
| x_results | OUT | PO_VALIDATION_RESULTS_TYPE | Data structure |
| x_result_type | OUT | VARCHAR2(30) | Indicates whether the validation subroutine was SUCCESSFUL, or produced WARNINGS/FAILURES/FATAL ERRORS. This is a rollup of the result type of each individual result produced by the validation subroutine. |

Attributes to be validated are passed into the subroutine, as well as other attributes that may be used in order for the validation to perform. These parameters in one embodiment are tables of columns, which come from the validation type object as mentioned above.

When a validation subroutine detects a validation error or warning, the subroutine can insert the error into a global temporary table, such as PO_VALIDATION_RE-SULTS_GT. A parameter such as x_result_set_id can be used to identify the records. Such a method might be used when the validation is performed via a SQL statement, for example. The subroutine also could add the error in a parameter x_re-sults, which is of type PO_VALIDATION_RESULT-S_TYPE. Such an approach might be used when the validation is performed in PL/SQL code, for example.

Once all validations of a set are performed, the validation architecture can extract the results from an appropriate location, such as global temporary table PO_VALIDATION_RE-SULTS_GT, and can add the results to PO_VALIDATION-_RESULTS_TYPE. The PO_VALIDATION_RESULTS_GT table can contain the detailed results of the validation subroutines, and can be served as a temporary table into which the validation subroutines can populate results. An example of such a table is as follows:

| Column Name | Data Type | Size | Not Null | PK | Column Description |
|---|---|---|---|---|---|
| RESULT_SET_ID | NUMBER | | | | Identifies a set of results PO_VALIDATION_RESULT_SET_ID_S |
| RESULT_TYPE | VARCHAR2 | 30 | | | Indicates the type of the result: WARNING, FAILURE, FATAL, . . . If not populated, FAILURE can be assumed. |
| ENTITY_TYPE | VARCHAR2 | 30 | | | The name of the table to which the validation is related. |
| ENTITY_ID | NUMBER | | | | The primary key of the row of the table to which the validation is related. |
| COLUMN_NAME | VARCHAR2 | 30 | | | The column name of the table to which the validation is related. |
| COLUMN_VAL | VARCHAR2 | 4000 | | | Value of the column |
| MESSAGE_APPLICATION | VARCHAR2 | 30 | | | The product code for the dictionary message for this result. If this is not populated, 'PO' will be assumed. |
| MESSAGE_NAME | VARCHAR2 | 30 | | | The name of the dictionary message for this result. |
| TOKEN1_NAME | VARCHAR2 | 30 | | | Name/Value pairs for tokens used by the dictionary message. |
| TOKEN1_VALUE | VARCHAR2 | 4000 | | | These should only be populated if the dictionary message uses tokens. |
| TOKEN2_NAME | VARCHAR2 | 30 | | | |
| TOKEN2_VALUE | VARCHAR2 | 4000 | | | |
| TOKEN3_NAME | VARCHAR2 | 30 | | | |
| TOKEN3_VALUE | VARCHAR2 | 4000 | | | |

A corresponding example of an index is as follows:

| Index Name | Table Name | Column Name | Unique |
|---|---|---|---|
| PO_VALIDATION_RESULTS_U1 | PO_VALIDATION_RESULTS | RESULT_ID | X |
| PO_VALIDATION_RESULTS_N1 | PO_VALIDATION_RESULTS | RESULT_SET_ID | |

An example of a corresponding sequence is as follows:

| Sequence Name | Sequence Logic | Table Name |
|---|---|---|
| PO_VALIDATION_RESULT_ID_S | | PO_VALIDATION_RESULTS |
| PO_VALIDATION_RESULT_SET_ID_S | | PO_VALIDATION_RESULTS |

The PO_VALIDATION_RESULTS table also can contain the detailed results of the validation subroutines. An object of this type will eventually be returned to the caller with all the results coming from the validation subroutines. An example is as follows:

| Column Name | Data Type | Size | Not Null | PK | Column Description |
|---|---|---|---|---|---|
| RESULT_TYPE | VARCHAR2 | 30 | | | Indicates the type of the result: WARNING, FAILURE, FATAL, . . . If not populated, FAILURE can be assumed. |

-continued

| Column Name | Data Type | Size | Not Null | PK | Column Description |
|---|---|---|---|---|---|
| ENTITY_TYPE | VARCHAR2 | 30 | | | The name of the table to which the validation is related. |
| ENTITY_ID | NUMBER | | | | The primary key of the row of the table to which the validation is related. |
| COLUMN_NAME | VARCHAR2 | 30 | | | The column name of the table to which the validation is related. |
| COLUMN_VAL | VARCHAR2 | 4000 | | | Value of the column |
| MESSAGE_APPLICATION | VARCHAR2 | 30 | | | Product code for the dictionary message for this result. If not populated, 'PO' assumed. |
| MESSAGE_NAME | VARCHAR2 | 30 | | | The name of the dictionary message for this result. |
| TOKEN1_NAME | VARCHAR2 | 30 | | | Name/Value pairs for tokens used by the dictionary message. |
| TOKEN1_VALUE | VARCHAR2 | 4000 | | | |
| TOKEN2_NAME | VARCHAR2 | 30 | | | These should only be populated if the dictionary message uses tokens. |
| TOKEN2_VALUE | VARCHAR2 | 4000 | | | |
| TOKEN3_NAME | VARCHAR2 | 30 | | | |
| TOKEN3_VALUE | VARCHAR2 | 4000 | | | |
| TOKEN4_NAME | VARCHAR2 | 30 | | | |
| TOKEN4_VALUE | VARCHAR2 | 4000 | | | |

This object also contains several utility methods:

| Method Name | Method Description |
|---|---|
| GET_RESULT_SET_FROM_GT | Retrieve records from PO_VALIDATION_RESULTS_GT and add them to the object |
| ADD_RESULT | Used by validation subroutines to populate a new record to this object. Used by validation |

A package such as PO_VALIDATIONS package can contain procedures responsible for implementing a validation architecture. Developers who implement new validations can add their validation subroutine calls to this package. Such a package can be used to perform common processing that is generally required by most validation flows. The following are primary components inside an exemplary PO_VALIDATIONS package:

| Component | Description |
|---|---|
| Validation Subroutine Identifiers | Each identifier is a constant corresponds to a validation subroutine. |
| Validation Sets | Each set is a pre-defined list of validation subroutine identifiers. These sets are also defined as constants |
| Validate_set( ) procedure | This is a switchboard procedure that takes in a validation set and other input parameters. For each validation subroutine identifier in the validation set, this procedures make a call out to the corresponding validation subroutine. |

As discussed above, there can be a number of validation subroutines, each with a validation subroutine identifier, as well as any number of validation sets from the caller(s). In one embodiment, each validation identifier is simply a constant of varchar2. As long as it is unique, the value of the constant is not important. The convention is that the value is the same as the name of the constant.

```
-- Identifier for validating amount >= 0
c_amount_limit_ge_zero CONSTANT VARCHAR2(30) :=
  'c_amount_limit_ge_zero';
```

-continued

```
-- identifier for validating end date column
c_end_date CONSTANT VARCHAR2(30) := 'c_end_date';
...
```

Validation sets can group these identifiers together. A different validation set may be used, depending on the module that calls the validation subroutine, as well as the entity record for which the validation is being performed. All the validation sets can be defined in the PO_VALIDATIONS package as well:

```
-- Set of validations for validate standard PO header record
entered from UI
c_ui_order_header CONSTANT PO_TBL_VARCHAR2000 :=
  PO_TBL_VARCHAR2000 (
    c_rate_ge_zero,
    c_agent_id,
    ...
  );
-- Set of validations for validate agreement PO header record
entered from UI
c_ui_agr_header CONSTANT PO_TBL_VARCHAR2000 :=
  PO_TBL_VARCHAR2000 (
    c_rate_ge_zero,
    c_amount_limit_ge_zero, -- This validation is only required
for agreements
    c_agent_id,
    ...
  );
```

As many validation subroutine identifiers and validation sets can be defined as are needed. A set of validations can be executed in the order determined by the table index of the validation.

The following example illustrates how new validations can be added to the architecture in accordance with one embodiment. When adding a new validation, a caller first implements the validation subroutine. The caller or developer then adds a call to the subroutine from a procedure such as a PO_VALIDATIONS.validate_set( ) procedure. A new validation subroutine identifier is created and the validation subroutine is added to a validation set. A public subprogram (e.g., validation API) is included to execute the validation set.

A validation subroutine may be implemented in any package, although the subroutine should satisfy the contract of a validation subroutine as was stated previously. The following demonstrates an example of how a validation subroutine might be implemented in accordance with one embodiment, here to display a warning message if the supplier is on hold. Logic common to a set of validation subroutines could be extracted out and placed in a common procedure call, but this is not include here for sake of simplicity. Further, hard-coded strings found in the following code would be replaced with constants in actual code, but again are omitted for purposes of clarity and ease of understanding:

```
PROCEDURE warn_supplier_on_hold(
    p_header_id_tbl   IN PO_TBL_NUMBER
  , p_vendor_id_tbl   IN PO_TBL_NUMBER
  , x_result_set_id   IN OUT NOCOPY NUMBER
  , x_result_type     OUT NOCOPY VARCHAR2
  )
IS
d_mod CONSTANT VARCHAR2(100) := D_warn_supplier_on_hold;
BEGIN
IF (x_result_set_id IS NULL) THEN
    x_result_set_id := PO_VALIDATIONS.next_result_set_id();
END IF;
FORALL i IN 1 .. p_header_id_tbl.COUNT
INSERT INTO PO_VALIDATION_RESULTS_GT
( result_set_id
, result_type
, entity_type
, entity_id
, column_name
, column_val
, message_name
)
SELECT
    x_result_set_id
, PO_VALIDATIONS.c_result_type_WARNING
, c_entity_type_HEADER
, p_header_id_tbl(i)
, c_VENDOR_ID
, TO_CHAR(p_vendor_id_tbl(i))
, PO_MESSAGE_S.PO_PO_VENDOR_ON_HOLD
FROM
    PO_VENDORS SUPPLIER
WHERE
    SUPPLIER.vendor_id = p_vendor_id_tbl(i)
AND SUPPLIER.hold_flag = 'Y'
;
IF(SQL%ROWCOUNT > 0) THEN
    x_result_type := PO_VALIDATIONS.c_result_type_WARNING;
ELSE
    x_result_type := PO_VALIDATIONS.c_result_type_SUCCESS;
END IF;
END warn_supplier_on_hold;
```

The validation subroutine should be called from the validation architecture, such as from within PO_VALIDATIONS.validate_set. An exemplary implementation of such as process could proceed as follows.

```
CREATE OR REPLACE PACKAGE BODY PO_VALIDATIONS AS
...
c_warn_supplier_on_hold CONSTANT VARCHAR2(30) :=
    'C_WARN_SUPPLIER_ON_HOLD';
PROCEDURE validate_set(
    ...
    CASE 1_val
    ...
      WHEN c_warn_supplier_on_hold THEN
        PO_VAL_HEADERS.warn_supplier_on_hold(
          p_header_id_tbl => p_headers.po_header_tbl
        , p_vendor_id_tbl => p_headers.vendor_id
        , x_result_set_id => 1_result_set_id
        , x_result_type => 1_result_type
        );
    ...
    END CASE;
...
```

The validation subroutine also can be added to a validation set, such as is set forth by the following:

```
-- Set of validations for validate standard PO header record entered
   from UI
c_ui_order_header CONSTANT PO_TBL_VARCHAR2000 :=
    PO_TBL_VARCHAR2000 (
      c_rate_ge_zero,
      c_agent_id,
      c_warn_supplier_on_hold,
      ...
    );
```

A validation interface (e.g., a validation API) also can be provided for the validation set. If a new module is created and needs to utilize validation architecture, a wrapper can be created inside PO_VALIDATIONS for this new module to call. The wrapper can determine which validation set to use, since the wrapper is module specific. The wrapper also can invoke a validate_set procedure, such as by the following:

```
CREATE OR REPLACE PACKAGE BODY PO_VALIDATIONS AS
...
PROCEDURE validate_ui_header(
    p_headers IN PO_HEADERS_VAL_TYPE
  , x_result_type OUT NOCOPY VARCHAR2
  , x_results OUT NOCOPY PO_VALIDATION_RESULTS_TYPE
  )
IS
BEGIN
    -- STEP1: determine the validation set to use. It can be a pre-
defined
    -- one, or a union of multiple pre-defined validation sets
    -- STEP2: invoke validation_set
END validate_ui_header;
```

In an embodiment where the validation architecture is implemented at the back-end, such as in PL/SQL in database tier, an advantage is obtained in that the validation architecture also can be invoked from the middle tier, which can be written in Java or another appropriate language. Such an architecture can replace the traditional way of validating an entity record, and can be particularly useful when an application wants to have control over when the validation should be performed.

Figure 3:
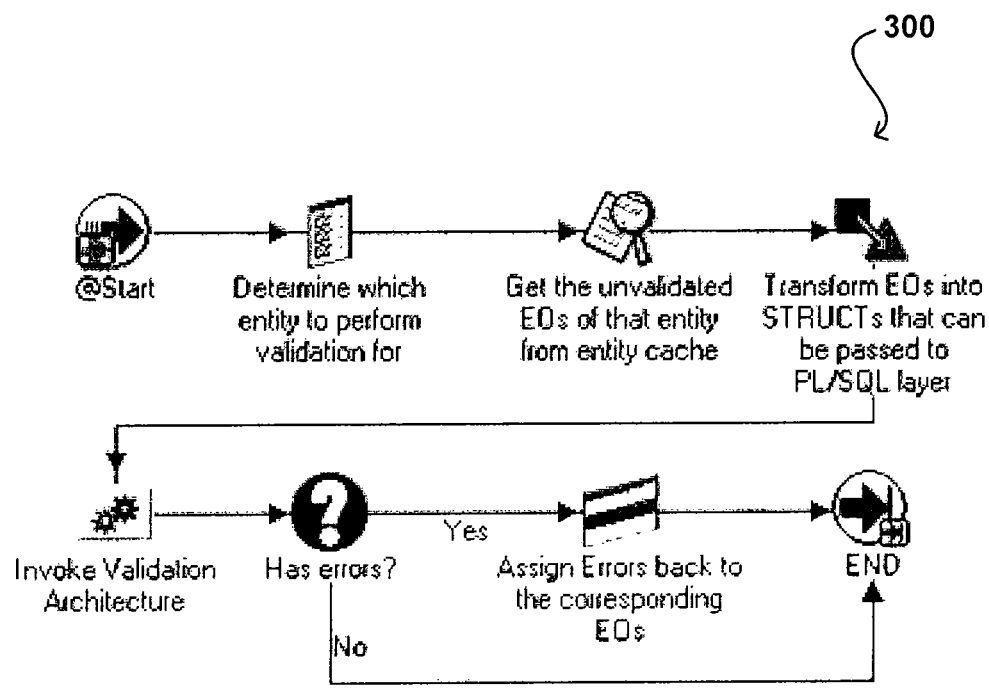
FIG. 3 illustrates an exemplary execution flow of a validation architecture in accordance with one embodiment of the present invention.

FIG. 3 illustrates an exemplary logic flow 300 for the validation process in accordance with one embodiment. In this example, a caller determines at least one entity for which to perform validation, and obtains the unvalidated entity objects of that entity, such as from an entity cache. The entity objects in this example are transformed into structures that can be passed to the PL/SQL layer. The caller then can invoke the validation architecture. If there are no errors, then the process can end as discussed elsewhere herein. If there are errors, the errors can first be assigned back to the corresponding entity objects.

Figure 4:
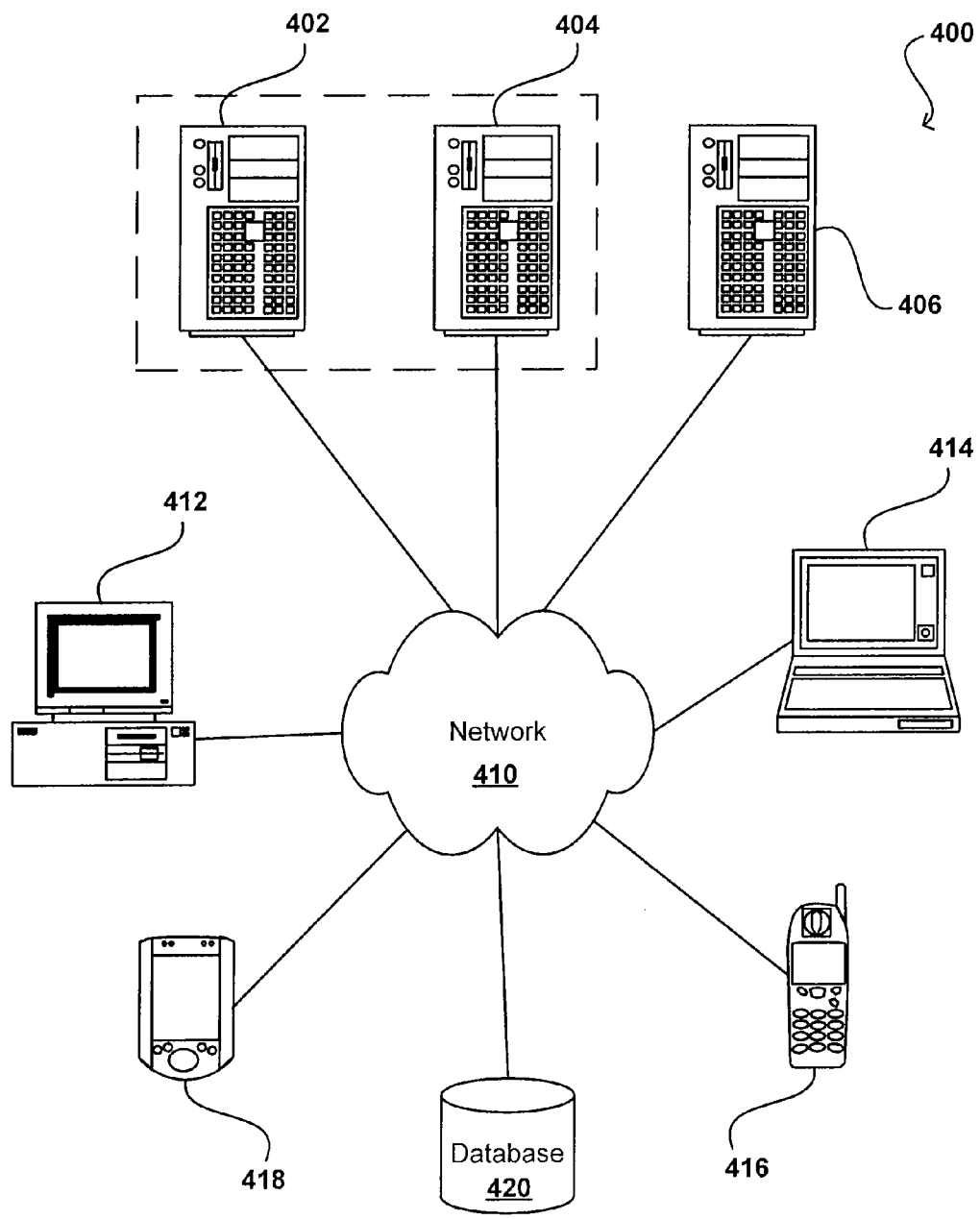
FIG. 4 illustrates components of a computer network that can be used in accordance with one embodiment of the present invention.

FIG. 4 is a block diagram illustrating components of an exemplary operating environment in which various embodiments of the present invention may be implemented. The system 410 can include one or more user computers, computing devices, or processing devices 412, 414, 416, 418, which can be used to operate a client, such as a dedicated application, web browser, etc. The user computers 412, 414, 416, 418 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 412, 414, 416, 418 may also have any of a variety of applications, including one or more development systems, database client and/or server applications, and Web browser applications. Alternatively, the user computers 412, 414, 416, 418 may be any other electronic device, such as a thin-client computer, Internet-enabled gaming system, and/or personal messaging device, capable of communicating via a network (e.g., the network 410 described below) and/or displaying and navigating Web pages or other types of electronic documents. Although the exemplary system 400 is shown with four user computers, any number of user computers may be supported.

In most embodiments, the system 400 includes some type of network 410. The network may can be any type of network familiar to those skilled in the art that can support data communications using any of a variety of commercially-available protocols, including without limitation TCP/IP, SNA, IPX, AppleTalk, and the like. Merely by way of example, the network 410 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 402, 404, 406 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 406) may be dedicated to running applications, such as a business application, a Web server, application server, etc. Such servers may be used to process requests from user computers 412, 414, 416, 418. The applications can also include any number of applications for controlling access to resources of the servers 402, 404, 406.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 412, 414, 416, 418. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 412, 414, 416, 418.

The system 400 may also include one or more databases 420. The database(s) 420 may reside in a variety of locations. By way of example, a database 420 may reside on a storage medium local to (and/or resident in) one or more of the computers 402, 404, 1406, 412, 414, 416, 418. Alternatively, it may be remote from any or all of the computers 402, 404, 406, 412, 414, 416, 418, and/or in communication (e.g., via the network 410) with one or more of these. In a particular set of embodiments, the database 420 may reside in a storage-area network ("SAN") familiar to those skilled in the art. Similarly, any necessary files for performing the functions attributed to the computers 402, 404, 406, 412, 414, 416, 418 may be stored locally on the respective computer and/or remotely, as appropriate. In one set of embodiments, the database 420 may be a relational database, such as Oracle 10g, that is adapted to store, update, and retrieve data in response to SQL-formatted commands.

Figure 5:
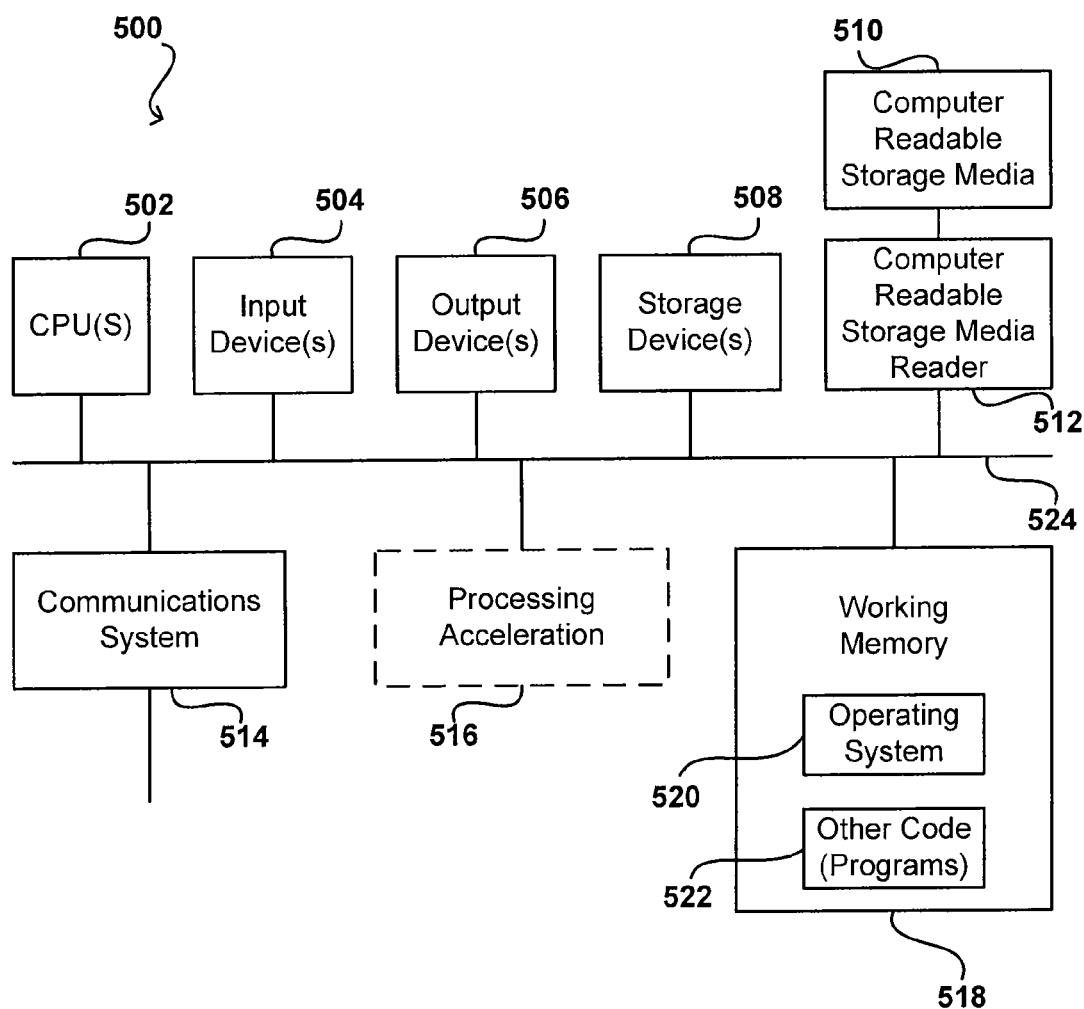
FIG. 5 illustrates components of a computerized device that can be used in accordance with one embodiment of the present invention.

FIG. 5 illustrates an exemplary computer system 500, in which various embodiments of the present invention may be implemented. The system 500 may be used to implement any of the computer systems described above. The computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). The computer system 500 may also include one or more storage devices 508. By way of example, the storage device(s) 508 can include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor DSP, a special-purpose processor, and/or the like.

The computer-readable storage media reader 512 can further be connected to a computer-readable storage medium 510, together with (and, optionally, in combination with storage device(s) 508) comprehensively representing remote, local, fixed, and/or removable storage devices plus storage media for temporarily and/or more permanently containing, storing, transmitting, and retrieving computer-readable information. The communications system 514 may permit data to be exchanged with the network and/or any other computer described above with respect to the system 500.

The computer system 500 may also comprise software elements, shown as being currently located within a working memory 518, including an operating system 520 and/or other code 522, such as an application program (which may be a client application, Web browser, mid-tier application, RDBMS, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of validating data, comprising:
providing a single entry point to invoke a validation application programming interface (API) from a calling application, wherein the validation API includes a validation architecture including code, written in a first language, for validating data, the validation architecture including an interface operable to receive validation calls from applications written in the first language and at least one other language, wherein the interface is configured to define a central process for passing in validation sets to be validated;
providing a centralized location for placing all validation logic for each entity in a plurality of entities, wherein the central processing and centralized location for placing all validation logic provides a framework for performing common validation processing that is required for a majority of validation sets, and wherein the framework specifies a source for the majority of validation sets;
receiving, at the interface, a validation call including a validation set from an entity of the plurality of entities, the validation set including information for at least one validation to be executed using the validation architecture, wherein the validation set includes validation attributes of the entity;
based on the validation set, determining which validation processes from a plurality of validation processes are to be executed, wherein certain validations within the validation set are dynamically disabled which are not applicable the validation set;
based on the validation set, interpreting validation failures differently according to requirements of the calling application and specifying document types for which a particular validation is applicable;
based on the determination, performing one or more of the determined validations for each instance of information in the validation set, wherein the performing includes accessing the centralized location;
determining any errors or warnings for each validation; and
returning results of each validation and any errors or warnings in response to the validation call.

2. The method according to claim 1, wherein:
the validation call is able to be received from any of a remote application, a local application, a front-end application, a back-end application, a front-end layer, a back-end layer, and a middle layer.

3. The method according to claim 1, wherein the first language is PL/SQL.

4. The method according to claim 3, wherein the interface is a PL/SQL API operable to function as a starting point for entity-level validations.

5. The method according to claim 1, further comprising:
defining standardized methods for passing entity attributes to be validated in the validation calls.

6. The method according to claim 1, further comprising:
storing all validation logic relating to the validation architecture in a central location.

7. The method according to claim 1, wherein the validation call is a bulk call including a plurality of instances of information to be validated.

8. The method according to claim 1, further comprising:
receiving a subroutine to enable an additional validation procedure to be executed via the validation framework.

9. The method according to claim 8, further comprising:
registering the subroutine with the validation framework.

10. A system for validating data, comprising:
a processor; and
a memory device storing instructions that, when executed by the processor, cause the processor to:
provide a single entry point to invoke a validation application programming interface (API) from a calling application, wherein the validation API includes a validation architecture including code, written in a first language, for validating data, the validation architecture including an interface operable to receive validation calls from applications written in the first language and at least one other language, wherein the interface is configured to define a central process for passing in validation sets to be validated;
provide a centralized location for placing all validation logic for each entity in a plurality of entities, wherein the central processing and centralized location for placing all validation logic provides a framework for performing common validation processing that is required for a majority of validation sets, and wherein the framework specifies a source for the majority of validation sets;
receive, at the interface, a validation call including a validation set from an entity of the plurality of entities, the validation set including information for at least one validation to be executed using the validation architecture, wherein the validation set includes validation attributes of the entity;
based on the validation set, determine which validation processes from a plurality of validation processes are to be executed, wherein certain validations within the validation set are dynamically disabled which are not applicable the validation set;
based on the validation set, interpret validation failures differently according to requirements of the calling application and specify document types for which a particular validation is applicable;
based on the determination, perform one or more of the determined validations for each instance of information in the validation set, wherein the performing includes accessing the centralized location;

determining any errors or warnings for each validation; and returning results of each validation and any errors or warnings in response to the validation call.

11. The system according to claim 10, wherein:
the validation call is able to be received from any of a remote application, a local application, a front-end application, a back-end application, a front-end layer, a back-end layer, and a middle layer.

12. The system according to claim 10, wherein the first language is PL/SQL.

13. The system according to claim 12, wherein the interface is a PL/SQL API operable to function as a starting point for entity-level validations.

14. The system according to claim 10, wherein the memory device further stores instructions that, when executed by the processor, cause the processor to:
define standardized methods for passing entity attributes to be validated in the validation calls.

15. The system according to claim 10, wherein the memory device further stores instructions that, when executed by the processor, cause the processor to:
store all validation logic relating to the validation architecture in a central location.

16. The system according to claim 10, wherein the validation call is a bulk call including a plurality of instances of information to be validated.

17. The system according to claim 10, wherein the memory device further stores instructions that, when executed by the processor, cause the processor to:
receive a subroutine to enable an additional validation procedure to be executed via the validation framework.

18. A non-transitory computer medium having sets of instructions stored thereon which, when executed by a computer, cause the computer to:
provide a single entry point to invoke a validation application programming interface (API) from a calling application, wherein the validation API includes a validation architecture including code, written in a first language, for validating data, the validation architecture including an interface operable to receive validation calls from applications written in the first language and at least one other language, wherein the interface is configured to define a central process for passing in validation sets to be validated;
provide a centralized location for placing all validation logic for each entity in a plurality of entities, wherein the central processing and centralized location for placing all validation logic provides a framework for performing common validation processing that is required for a majority of validation sets, and wherein the framework specifies a source for the majority of validation sets;
receive, at the interface, a validation call including a validation set from an entity of the plurality of entities, the validation set including information for at least one validation to be executed using the validation architecture, wherein the validation set includes validation attributes of the entity;
based on the validation set, determine which validation processes from a plurality of validation processes are to be executed, wherein certain validations within the validation set are dynamically disabled which are not applicable the validation set;
based on the validation set, interpret validation failures differently according to requirements of the calling application and specify document types for which a particular validation is applicable;
based on the determination, perform one or more of the determined validations for each instance of information in the validation set, wherein the performing includes accessing the centralized location;
determine any errors or warnings for each validation; and
return results of each validation and any errors or warnings in response to the validation call.

19. The non-transitory computer program product according to claim 18, wherein:
the validation call is able to be received from any of a remote application, a local application, a front-end application, a back-end application, a front-end layer, a back-end layer, and a middle layer.

20. The non-transitory computer program product according to claim 18, wherein the first language is PL/SQL.

21. The non-transitory computer program product according to claim 18, further comprising:
program code for defining standardized methods for passing entity attributes to be validated in the validation calls.

22. The non-transitory computer program product according to claim 18, further comprising:
program code for storing all validation logic relating to the validation architecture in a central location.

23. The non-transitory computer program product according to claim 18, wherein the validation call is a bulk call including a plurality of instances of information to be validated.

24. The non-transitory computer program product according to claim 18, further comprising:
program code for receiving a subroutine to enable an additional validation procedure to be executed via the validation framework.

25. The non-transitory computer program product according to claim 24, further comprising:
program code for registering the subroutine with the validation framework.

* * * * *

UNITED STATES PATENT AND TRADEMARK OFFICE
CERTIFICATE OF CORRECTION

PATENT NO. : 8,418,142 B2
APPLICATION NO. : 12/017821
DATED : April 9, 2013
INVENTOR(S) : Ao et al.

It is certified that error appears in the above-identified patent and that said Letters Patent is hereby corrected as shown below:

In the Specification:

In column 4, line 48, delete "if" and insert -- If --, therefor.

In column 13, line 34, delete "may can" and insert -- may --, therefor.

In column 13, line 45, delete "GRPS," and insert -- GPRS, --, therefor.

Signed and Sealed this
Thirtieth Day of July, 2013

Teresa Stanek Rea
*Acting Director of the United States Patent and Trademark Office*